Patented Oct. 15, 1940

2,218,032

UNITED STATES PATENT OFFICE 2,218,032

PREPARATION OF GLUTACONIC ACID

Norman D. Scott, Sanborn, N. Y., assignor to E. I. du Pont de Nemours & Company, Wilmington, Del., a corporation of Delaware No Drawing. Application October 2, 1939, Serial No. 297,431

7 Claims. (Cl. 260—537)

This invention relates to a method for preparing glutaconic acid.

This application is a continuation-in-part of my copending application Serial No. 228,003, filed September 1, 1938.

Heretofore glutaconic acid has been obtained from alpha-hydroxy-glutaric acid or ester by dehydration, or by saponification of beta-hydroxy-glutaronitrile or alpha-acetyl glutonic ester. It has been further suggested to prepare glutaconic acid by decarboxylation of dicarboxy glutaconic ester or isoaconitic ester, by thermal decomposition of pyrazoline dicarbonic ester, and also by fission of a number of cyclic acids or esters such as coumalic acid or ethoxypyrone dicarbonic ester. These known processes, however, are more or less restricted to laboratory use only, since the starting materials themselves are not available in appreciable quantities.

An object of the present invention is an improved method for preparing glutaconic acid. A further object is to prepare glutaconic acid from relatively inexpensive raw materials. Other objects will be apparent from the present disclosure.

I have found that glutaconic acid can be prepared in good yields when subjecting propiolic acid or its salts to the action of aqueous solutions of certain alkaline reagents. Propiolic acid may readily be prepared by carboxylation of sodium acetylide, thus utilizing the relatively inexpensive raw materials, acetylene, sodium and carbon dioxide. Although the reaction mechanism is not definitely known, it is believed that propiolic acid salts are hydrolyzed and condensed in the alkaline medium and then split off formate, yielding the glutaconic acid salt. Thus sodium propiolate CH≡CCOONa in alkaline solution is transformed into the sodium salt of glutaconic acid NaCO$_2$CH$_2$CH=CHCO$_2$Na which can be easily transformed into glutaconic acid by acidification, e. g. with dilute sulfuric acid.

The alkaline materials to be reacted with the propiolate in accordance with my invention are the alkali metal hydroxides, the alkaline earth metal hydroxides and water-soluble quaternary organic ammonium hydroxides. Examples of the latter suitable for my invention are tetraalkyl ammonium hydroxides, such as tetramethyl ammonium hydroxide, tetraethyl ammonium hydroxide and dimethyl, diethyl ammonium hydroxide.

A convenient way for carrying out my invention consists in heating a sodium propiolate solution with about two molecular proportions of sodium hydroxide at about 60° C. for about 6 hours and acidifying the resultant mixture with dilute sulfuric acid. The resultant glutaconic acid then can be extracted with ether or the like.

Although any propiolic acid salt can be used for the process of my invention, I prefer to use salts which are prepared from purified propiolic acid, more particularly the alkali metal salts prepared from such purified propiolic acid, since the salts prepared from purified propiolic acid give a purer glutaconic acid which can be more readily separated from the reaction mixture than when prepared from crude propiolate. Of course, it is not necessary to introduce the propiolate as such into the alkaline solution but the propiolate can be also formed by the reaction of the alkaline reaction medium and the propiolic acid. Thus when propiolic acid is added to a sodium hydroxide solution, sodium propiolate is formed which then is acted on by the remaining caustic solution. The propiolate and alkali both should be in solution.

My invention is further illustrated by the following examples:

Example I 50.8 grams of propiolic acid (94.8%, i. e. 1 mol) were dissolved in 340 cc. water. 322 cc. of 9.3 N sodium hydroxide (3 mol) were added to the propiolic acid solution while cooling to 10—20° C. The reaction mixture was then placed under nitrogen atmosphere by passing nitrogen through the reaction vessel and the reaction mixture was heated to 60° C. for 6 hours. The reaction mixture then was cooled to 10° to 20° C. and acidified by adding dropwise 360 cc. of diluted sulfuric acid, containing 60 cc. of concentrated sulfuric acid. The acidified mixture was saturated with ammonium sulfate and repeatedly extracted with washed ether. The extract was dried with magnesium sulfate, filtered and evaporated in vacuo at 85 to 95° C. Thus a yield of 23.7 grams of crude glutaconic acid, i. e. a 73% yield based on the propiolic acid used was obtained.

Example II

The process described in Example I was repeated, but using other alkaline reagents in place of the sodium hydroxide. The following results were obtained:

| Alkaline reagent | Concentration of alkaline reagent | Ratio: mols alkaline reagent to mols propiolate | Yield of glutaconic acid |
|---|---|---|---|
| | | | Percent |
| Barium hydroxide | 2.5-normal | 1:1 | 47.7 |
| Calcium hydroxide | do | 0.8:1 | 12.7 |
| Tetramethyl ammonium hydroxide | 1-normal | 2.5:1 | 51.0 |

If desired, the crude glutaconic acid can be recrystallized in dichlorethyl ether or other solvent, by which method about 82% of the crude glutaconic acid can be recovered as pure glutaconic acid.

My invention is not restricted to the specific procedure of the examples and is to be understood in its broad scope as defined in the appended claims. However, it has been found that the formation of glutaconic acid occurs most readily within a temperature range of about 40 to 100° C. and I prefer to carry out the process of my invention at about 60° C. The ratio of alkaline substance to the propiolate may vary widely; in general the rate of reaction will increase as the ratio of alkali to propiolate and the concentration of the alkali are increased. Preferably, the molar ratio of alkali to propiolate should be about 1 to 3 mols of the alkali to one mol of the propiolate. For example, it has been found that when using sodium hydroxide as the alkaline reaction medium a molecular ratio of about 1.5 to 2.5 moles of sodium hydroxide to one mole of the propiolic acid salt is especially suitable, or in the case of propiolic acid, a ratio of about 2.5:1 to 3.5:1, one mole of the hydroxide being consumed for neutralization of the acid. When using other alkaline reaction mediums, for example, other alkali metal hydroxides such as potassium hydroxide, alkaline earth hydroxides or the soluble quaternary organic ammonium hydroxides, equivalent amounts giving about the same alkalinity may be used. Solutions being about 2.5 to 2.7 normal with respect to sodium hydroxide have been found especially advantageous; lower and higher concentrations, however, may be utilized if desired without departing from the spirit of my invention. High alkali concentrations, however, may lead to too violent reactions and the formation of undesired by-products. The term glutaconic acid as used in the claims includes also the salts of glutaconic acid which can be easily transformed into the acid proper by acidification.

I claim:

1. The method of preparing glutaconic acid which comprises subjecting propiolic acid in solution to the action of an alkaline reagent selected from the group consisting of alkali metal hydroxides, alkaline earth metal hydroxides, and water-soluble quaternary organic ammonium hydroxides.

2. The method of preparing glutaconic acid which comprises subjecting an alkali metal salt of propiolic acid in solution to the action of an alkaline reagent selected from the group consisting of alkali metal hydroxides, alkaline earth metal hydroxides, and water-soluble quaternary organic ammonium hydroxides.

3. The method of preparing glutaconic acid which comprises subjecting propiolic acid in solution to the action of an alkaline reagent selected from the group consisting of alkali metal hydroxides, alkaline earth metal hydroxides, and water-soluble quaternary organic ammonium hydroxides at a temperature within the range of about 40 to 100° C.

4. The method of preparing glutaconic acid which comprises subjecting propiolic acid in solution to the action of an alkali metal hydroxide at a temperature within the range of about 40 to 100° C., the molecular ratio of the alkali metal hydroxide to propiolic acid being substantially in excess of 1:1.

5. The method of preparing glutaconic acid which comprises subjecting propiolic acid in solution to the action of an alkali metal hydroxide at a temperature within the range of about 40 to 100° C., the molecular ratio of the alkali metal hydroxide to propiolic acid being about 2.5:1 to 3.5:1.

6. The method of preparing glutaconic acid which comprises subjecting propiolic acid in solution to the action of an alkali metal hydroxide at a temperature of about 60° C., the molecular ratio of the alkali metal hydroxide to propiolic acid being about 2.5:1 to 3.5:1.

7. The method of preparing glutaconic acid which comprises subjecting propiolic acid in solution to the action of sodium hydroxide at a temperature of about 40 to 100° C., the molecular ratio of sodium hydroxide to propiolic acid being about 2.5:1 to 3.5:1, and the solution being about 2.5 to 2.7 normal with respect to the sodium hydroxide.

NORMAN D. SCOTT.